United States Patent
Hierzer

(10) Patent No.: US 10,757,772 B2
(45) Date of Patent: Aug. 25, 2020

(54) CONTROL DEVICE FOR AN LED LIGHT AND METHOD FOR CONTROLLING AN LED LIGHT

(71) Applicant: H4X e.U., Graz (AT)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 0 days.

(21) Appl. No.: 16/440,013

(22) Filed: Jun. 13, 2019

(65) Prior Publication Data

US 2019/0387590 A1 Dec. 19, 2019

(30) Foreign Application Priority Data

Jun. 14, 2018 (DE) .................. 10 2018 209 561

(51) Int. Cl.
*H05B 33/08* (2020.01)
*H05B 45/10* (2020.01)
(Continued)

(52) U.S. Cl.
CPC ............ *H05B 45/10* (2020.01); *H05B 45/37* (2020.01); *H05B 45/395* (2020.01); *H05B 47/10* (2020.01)

(58) Field of Classification Search
CPC ............ H05B 33/0812; H05B 33/0815; H05B 33/0845; H05B 33/0851
(Continued)

(56) References Cited

U.S. PATENT DOCUMENTS 9,743,485 B2 8/2017 Dunser et al.
10,143,048 B2 11/2018 Hierzer
(Continued)

FOREIGN PATENT DOCUMENTS

DE 102013108257 A1 2/2015
DE 102015102533 A1 8/2016
(Continued)

OTHER PUBLICATIONS

Quad- et al: Analog Dialogue "A forum for the exchange of circuits. systems, and software for real-world signal processing a Li-Ion Battery Charging Requires Accurate Voltage Sensing (p. 3)".Jody Lapham. 1. Jan. 1997 (1997-81-01). XP855639446 downloaded from Internet: URL:https://www.analog.comjmedia/en;analog-dialoguejvolume-31/number-2/articlesjvolume31-number2.pdf#page=19 (downloaded on Nov. 6, 2019] Absatz 25—Seite 19; Abbildung 3.

(Continued)

*Primary Examiner* — Tung X Le
(74) *Attorney, Agent, or Firm* — Millen, White, Zelano & Branigan, P.C.; William F. Nixon

(57) ABSTRACT

A control device for LED lighting means of a lighting device includes a first lighting means module having one or more first LED lighting means. The control device includes a first voltage regulator arranged in the first lighting means module and connected in series with the one or more first LED lighting means. The control device includes a control signal generator configured to generate and provide a digital lighting means control signal at a generator output and a first digital-to-analog converter, which is coupled between the generator output of the control signal generator and a control input of the first voltage regulator and is configured to convert the digital lighting means control signal of the control signal generator into an analog lighting means control signal and to feed it into the control input of the first voltage regulator.

20 Claims, 2 Drawing Sheets

(51) Int. Cl.
*H05B 45/37* (2020.01)
*H05B 45/395* (2020.01)
*H05B 47/10* (2020.01)

(58) Field of Classification Search
USPC .................................................. 315/294, 307
See application file for complete search history.

(56) References Cited

U.S. PATENT DOCUMENTS

| | | | |
|---|---|---|---|
| 10,337,699 B2 | 7/2019 | Hierzer | |
| 2010/0156315 A1* | 6/2010 | Zhao | H05B 33/0818 315/294 |
| 2013/0249437 A1* | 9/2013 | Wang | H05B 33/0815 315/307 |
| 2014/0191670 A1 | 7/2014 | Liang | |
| 2014/0354170 A1* | 12/2014 | Gredler | H05B 45/10 315/224 |
| 2014/0361701 A1* | 12/2014 | Siessegger | H05B 33/0806 315/200 R |
| 2015/0351173 A1 | 12/2015 | Dunser et al. | |
| 2018/0014370 A1* | 1/2018 | Wang | H05B 45/395 |

FOREIGN PATENT DOCUMENTS

| | | |
|---|---|---|
| DE | 202017105722 U1 | 11/2017 |
| DE | 102016217332 A1 | 3/2018 |
| EP | 3154316 B1 | 3/2018 |
| WO | 2014/117193 A2 | 8/2014 |
| WO | 14117193 A2 | 8/2014 |

OTHER PUBLICATIONS

EP search report in corresponding 19179562.4 dated Nov. 14, 2019 (pp. 1-10).
English Abstract of DE 102013108257 A1 published Feb. 19, 2015.
English Abstract of DE 102015102533 A1 published Aug. 25, 2016.

* cited by examiner

CONTROL DEVICE FOR AN LED LIGHT AND METHOD FOR CONTROLLING AN LED LIGHT

TECHNICAL FIELD OF INVENTION

The present invention relates to a control device for LEDs of a lighting device, in particular a wall or ceiling mounted lighting device implemented as a downlight or wallwasher, as well as a method for controlling LED modules of a lighting device.

TECHNICAL BACKGROUND

For special lighting applications such as building lighting or event technology, LED strips or LED arrays of high power may be used, which are also referred to as "wallwashers". Such LED lighting devices may, for example, be used as floodlights for spot or stripe-shaped linear or spot illumination of extensive flat surfaces such as walls or facades, as disclosed for example in DE 10 2016 217 332 A1.

In order to control LED lighting means of such lighting devices, it is desirable to be able to adapt the control concept flexibly to the design and the desired characteristics of the lighting device. In addition, such lighting devices often comprise a modular design, and the control concept should be able to adapt to the modularity of the lighting device. DE 20 2017 105 722 U1, for example, discloses a digital-to-resistance-value-converter for a linear regulator for powering LEDs in motor vehicles.

SUMMARY OF THE INVENTION

It is therefore an object of the invention to provide flexible and scalable solutions for a low-loss control of light emitting diodes.

This object and other objects are achieved by a control device for an LED lighting device comprising the features of claim 1, by an LED lighting device comprising the features of claim 10, and by a method of controlling an LED lighting device comprising the features of claim 15.

According to a first aspect of the invention, a control device for LED lighting means of a lighting device, in particular a downlight or a wallwasher, comprises: a first lighting means module comprising one or more first LED lighting means; a first voltage regulator arranged in the first lighting means module and connected in series with the one or more first LED lighting means; a control signal generator configured to generate a digital lighting means control signal and to provide it at a generator output; and a first digital-to-analog converter coupled between the generator output of the control signal generator and a control input of the first voltage regulator, and configured to convert the digital lighting means control signal of the control signal generator into an analog lighting means control signal and to feed it into the control input of the first voltage regulator.

According to a second aspect of the invention, a lighting device, in particular a downlight or a wallwasher, comprises a control device according to the first aspect of the invention.

According to a third aspect of the invention, a method for controlling LED lighting means of a lighting device comprises the steps of: supplying a first lighting means module comprising one or more first LED lighting means with a DC voltage generated by a rectifier; generating a digital lighting means control signal by a control signal generator which is supplied with a supply voltage by the rectifier; feeding the digital lighting means control signal into a first digital-to-analog converter; converting, by the digital-to-analog converter, the digital lighting means control signal into an analog lighting means control signal; and feeding the analog lighting means control signal into a control input of a first voltage regulator connected in series with the one or more first lighting means.

The present invention is based on the idea to provide a combined control for LED lighting means from a voltage regulator and from a digital-to-analog converter, such that a control signal may be generated digitally, wherein the actual control of the voltage regulator is analog. Such a hybrid control makes it possible to use flexible control circuits which are compatible with common control systems and which may operate on the basis of DALI or ZigBee standards, for example. At the same time, however, high-frequency flickering which is typical of digital control signals is avoided when controlling the voltage regulator, which may otherwise result in disturbing artifacts in the light emission.

The use of hybrid control also enables a flexible modular arrangement of the individual components for a compact and design-oriented LED lighting device structure. In addition, the preponed digital-to-analog conversion of the control signals may result in a better efficiency of the controlled switching regulator.

Advantageous embodiments and further configurations result from the dependent claims as well as from the description when taken in combination with the drawings.

According to some embodiments of the control device for an LED lighting device, the control device may also comprise a rectifier which is configured to convert an AC voltage into a lighting means supply voltage. In some embodiments, the first lighting means module may be coupled with a voltage output of the rectifier. In some of those embodiments, the control signal generator may be supplied with a supply voltage by the rectifier.

According to some further embodiments of the control device according to the present invention, the control device may also comprise a DC-DC converter which is coupled between the voltage output of the rectifier and a supply input of the control signal generator. In some embodiments, the DC-DC converter may be a step-down converter.

According to some embodiments of the control device for an LED lighting device according to the present invention, the first digital-to-analog converter may comprise a series circuit of a voltage divider and a first-order or higher-order low-pass filter. In some alternative embodiments, the first digital-to-analog converter may comprise a series circuit of an R2R network and a second-order low-pass filter. A first-order or higher-order voltage divider-low-pass-filter-circuit provides an easy-to-implement solution for converting digital information signals into analog signals. Advantageously, this makes it possible to transmit control information for the voltage regulator at a constant frequency by varying the duty cycle. An R2R network also provides an easy-to-implement solution for digital-to-analog conversion. In an R2R network, a binary-coded input value is converted into a graded output voltage via a cascaded network of switched voltage dividers.

According to some further embodiments of the control device according to the present invention, the first voltage regulator may comprise a linear regulator or a switching regulator. A linear regulator provides good voltage stabilization and may be implemented, for example, as a fixed voltage regulator operating according to the linear regulator principle. A linear controller may be configured as an adjustable constant current source which may dynamically compensate for current changes that occur as a result of changes in the load resistance by selectively varying the operating voltage or the internal resistance of the constant current source.

According to some embodiments of the control device according to the present invention, such a linear regulator may comprise a constant current source with an operational amplifier operating as a voltage follower, a bipolar transistor coupled to the output of the operational amplifier via a base current limiting resistor, for example an NPN bipolar transistor, a shunt element coupled to the emitter of the bipolar transistor, and a compensation and vibration damping circuit feeding back the output of the operational amplifier to its inverting input. Such a constant current source offers the advantage that high currents may be regulated very precisely and quickly. In addition, the circuit structure may be provided with easily available standard components.

According to some further embodiments of the control device according to the present invention, the control signal generator may comprise an input interface. In some embodiments, the control signal generator may be configured to generate the digital lighting means control signal on the basis of a control signal received at the input interface, in particular a DALI control signal or ZigBee control signal. The DALI control signal or ZigBee control signal may indicate a target value for the dimming of one or more LED lighting devices of the first lighting means module.

According to some further embodiments of the control device according to the present invention, the control device may further control at least a second lighting means module coupled to the voltage output of the rectifier and comprising one or more second LED lighting devices, at least a second voltage regulator arranged in the second lighting means module and connected in series with the one or more second LED lighting devices, and at least a second digital-to-analog converter which is coupled between the generator output of the control signal generator and a control input of the second voltage regulator, and which is configured to convert the digital lighting means control signal of the control signal generator into an analog lighting means control signal and to feed it into the control input of the second voltage regulator. Due to the distribution architecture from the central control signal generator, the selection of the lighting means module may in principle be scaled indefinitely.

According to some embodiments of the lighting device according to the present invention, the control signal generator may be arranged on a control circuit board. In some embodiments, the first lighting means module and the first digital-to-analog converter may be arranged on a lighting means carrier board separate from the control circuit board.

According to some further embodiments of the lighting device according to the present invention, the control signal generator may be connected to the lighting means carrier board via a cable.

According to some further embodiments of the lighting device according to the present invention, one or more LED lighting devices may comprise high-voltage LEDs. The first voltage regulator may be a linear regulator. High-voltage LEDs are LEDs operated with DC voltage whose operating voltage is as close as possible to the effective mains voltage. This means that LED drivers used may get by with just a few components.

According to some alternative embodiments of the lighting device according to the present invention, the one or more LED lighting devices may comprise low-voltage LEDs. In this case, the first voltage regulator may comprise a switching regulator. Low-voltage LEDs, such as high-voltage LEDs, are LEDs operated with a DC voltage, but their operating voltage is significantly lower than the mains voltage and therefore require a separate voltage conversion. However, low-voltage LEDs usually have a slightly better efficiency than high-voltage LEDs.

According to some further embodiments of the lighting device according to the present invention, the rectifier may be configured to convert a mains AC voltage into a lighting device supply voltage of 48 volts.

According to some embodiments of the method for controlling an LED lighting device according to the present invention, the first digital-to-analog converter may comprise a series circuit formed of a voltage divider and a low-pass filter of the first or higher order. According to some further embodiments of the method according to the present invention, the first voltage regulator may comprise a linear regulator or a switching regulator.

According to some further embodiments of the method according to the present invention, the digital lighting means control signal may be generated by the control signal generator on the basis of a DALI control signal or ZigBee control signal received at an input interface of the control signal generator. The DALI control signal or the ZigBee control signal may, in some embodiments of the method according to the present invention, indicate a target value for the dimming of one or more LED lighting means.

The above embodiments may be combined with each other in any sensible way. Other possible embodiments and implementations of the present invention also include combinations of features of the present invention described above or in the following with regard to the exemplary embodiments, which are not explicitly mentioned. In particular, the skilled person may also add individual aspects as improvements or additions to the respective basic embodiment of the present invention.

BRIEF DESCRIPTION OF THE DRAWINGS

The present invention is explained in more detail below with reference to the accompanying drawings, in which.

The appended figures are intended to permit further understanding of the embodiments of the invention. They illustrate embodiments and serve, in conjunction with the description, to clarify principles and concepts of the invention. Other embodiments and many of the specified advantages become apparent by means of the drawings. The elements of the drawings are not necessarily shown true to scale with respect to one another. Direction-indicating terminology such as, for example, "at the top", "at the bottom", "on the left", "on the right", "above", "below", "horizontally", "vertically", "at the front", "at the rear" and similar indications are used merely for explanatory purposes and do not serve to restrict the general application to specific refinements as shown in the figures.

In the figures, identical, functionally identical and identically acting elements, features and components are each provided with the same reference symbols unless stated otherwise.

DETAILED DESCRIPTION OF EMBODIMENTS

Figure 1:
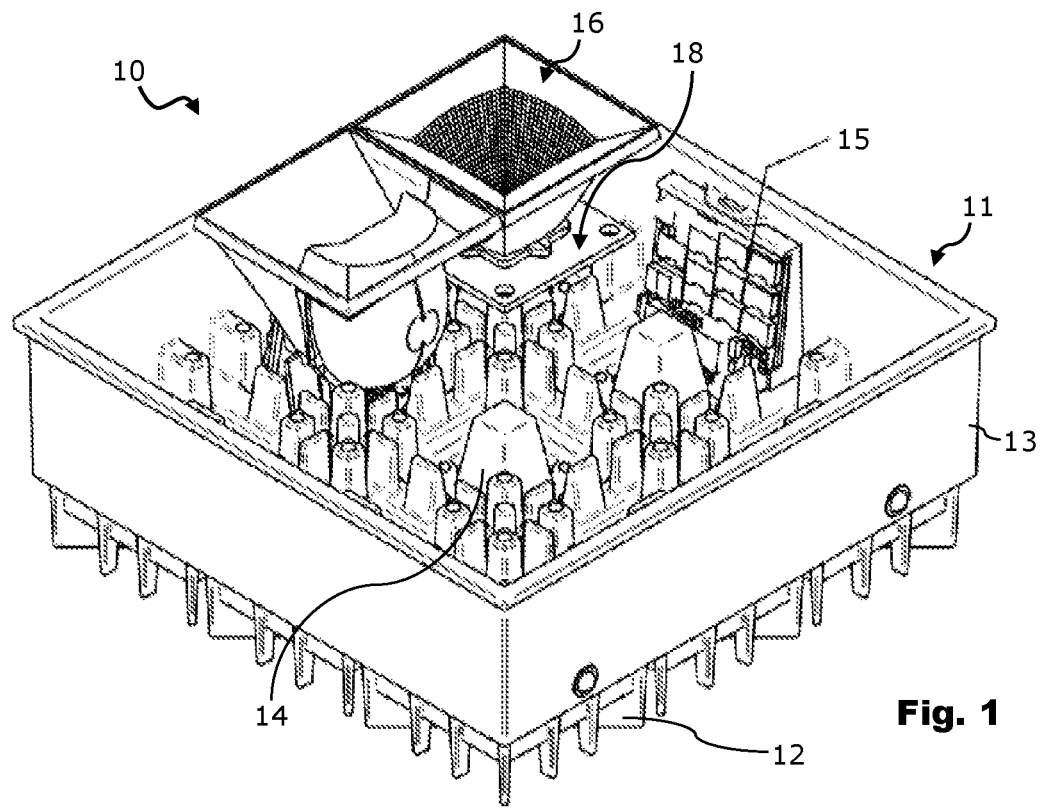
FIG. 1 is a partially assembled housing component of an LED lighting device in a perspective bottom view according to an embodiment of the present invention.

FIG. 1 shows a partially assembled housing component 11 of a lighting device 10. The lighting device 10 may comprise one or more light emitting diodes (LEDs) as active lighting means. The lighting device 10 may therefore also be referred to as an LED lighting device. For example, lighting device 10 may be installed in a suspended ceiling, for example, or attached to a ceiling, although it may also be attached to other parts of a building, such as a wall. The lighting device 10 may be freely configured by the customer prior to its manufacture and delivery, for example by a lighting designer, in order to combine several lighting effects to be represented by the lighting device 10 in the desired manner in the lighting device 10.

The lighting device 10 of FIG. 1 comprises a housing component 11 which may be die-cast, for example, in one piece from a metal material such as aluminum or an aluminum alloy. The housing component 11—as schematically shown in FIG. 1—may comprise a substantially square base area. The ratio of height to edge length of the square base area of the housing component 11 may be significantly smaller than 1, such that the external shape of the housing component 11 may comprise the basic shape of a flat parallelepiped.

The housing component 11 comprises a base 12 which is bounded by lateral housing walls 13, i.e. the base 12 represents a bottom of the housing component 11 and together with the housing walls defines an interior space of the housing component 11. The part of the housing component which is facing upwards in FIG. 1 is open.

As shown as an example in FIG. 1, a protruding section 14 or a large number of protruding sections 14 may be formed in the interior space on the basis of base 12, which may also be connected integrally with the housing component 11.

The protruding sections 14 may define functional fields of the lighting device 10. FIG. 1 shows an example of nine such functional fields arranged in a square matrix with 3×3 functional fields or 2×2 functional fields. The functional fields are each about the same size with each functional field also being square itself. It should be understood that other arrangements are also conceivable for the functional fields of lighting device 10, for example one or more individual spots in a row or another irregular arrangement of individual spots.

The housing component 11 of FIG. 1 may be used to form a lighting device 10 in a mounting frame not explicitly shown in the figures. For installation in a ceiling, for example, the installation frame may be provided with structures on its circumferential periphery which structures facilitate, for example, "borderless" installation, e.g. by means of filling in.

The lighting device 10 is designed to change between different lighting effects or lighting scenes in a variety of ways by switching or controlling accordingly, such that the lighting device 10 provides a flexible and compact lighting solution with which a wide variety of lighting effects may be achieved. For this purpose, a multitude of optical components 16 is implemented in the lighting device 10, each of which optical component may be, for example, a reflector. In the example shown in FIG. 1, two optical components 16, each assigned to one of the functional fields, are shown with a square outer shape in top view. For reasons of clarity, only two reflectors 16 are shown in FIG. 1, although the lighting device 10 may comprise optical components corresponding to all the functional fields in a completed state.

Light to be emitted by lighting device 10 is provided by active electrical lighting means 17, which are configured, for example, as LEDs or groups of LEDs. The lighting means 17 are shown as an example in FIG. 2, which shows a cross-sectional view across the housing component 11 of the lighting device 10. Each of the lighting means 17 may be arranged in lighting means receptacles (not shown) or lighting means slots (not shown) on a lighting means board 18, which supports the various LEDs or groups of LEDs with the lighting means board providing a corresponding electrical power supply for the lighting means 17. The lighting means 17 or the lighting means receptacles may each be assigned to one of the functional fields. Several separate lighting means carrier boards 18 may therefore be accommodated in the interior space of the housing component 11.

The optical components 16 provide a specific radiation characteristic to the light emitted by the lighting means 17, for example the radiation characteristic of a downlight. The radiation characteristic may thus be adjusted according to the functional field: Some of the functional fields may therefore comprise the radiation characteristic of a single lighting device which, when mounted on a ceiling, produces a circular or elliptical light cone, for example. Other functional fields may produce the radiation characteristic of a wallwasher, i.e. they comprise a main radiation direction that is oblique to the base of the housing component 11. Such a wallwasher characteristic may be used, for example, to illuminate a wall.

The lighting device 10 may generally be configured as a uniform lighting device with several lighting means 17 and associated optical components 16. The lighting means 17 of the lighting device 10 may be flexibly switched and/or controlled to create different lighting effects, for example individually or in different groups.

The lighting device 10 is very flexible and easily scalable due to its modular structure of the lighting means arranged in functional fields. In addition, a powerful option is created for generating a wide variety of lighting scenarios with different combinations of radiation characteristic and colour temperatures. The optional use of reflectors as optical components enables precise light control with high efficiency and effective glare reduction. The lighting device 10, for example, may be mounted in walls or ceilings with a ball snap in system at a shallow installation depth without use of special tools.

Figure 2:
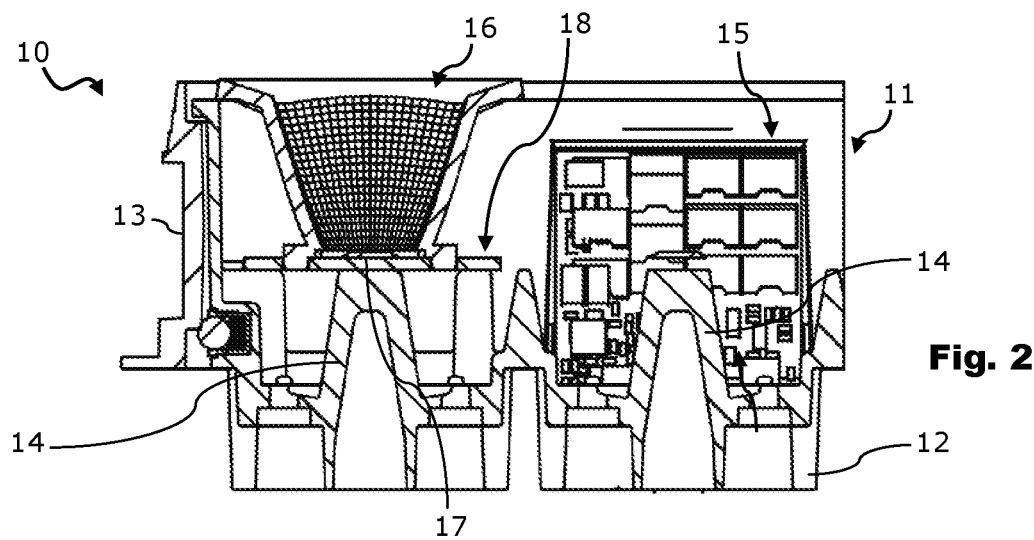
FIG. 2 is a schematic cross-sectional view across the housing component of an LED lighting device of FIG. 1 according to a further embodiment of the present invention.

FIG. 2 shows a schematic cross-sectional view across the housing component 11 of the lighting device 10 in FIG. 1. As already schematically indicated in FIG. 1, the lighting device 10 comprises a control device 20, which is distributed in the modular housing component 11 of the lighting device 10 in the example illustrated in FIGS. 1 and 2. On the one hand, the lighting device 10 comprises a control circuit board 15 which may receive digital control signals for the lighting device 10 via a digital input interface, such as DALI control signals or ZigBee control signals. The control circuit board 15 may comprise a control module with a control signal generator as described below with respect to FIGS. 3 and 4.

On the other hand, the lighting device 10 comprises lighting means modules which may be distributed on the lighting means carrier boards 18. The lighting means modules are also explained below in connection with FIGS. 3 and 4. The components on the lighting means carrier boards 18 (lighting means modules) and the components on the control circuit board 15, e.g. the control signal generator, may be supplied with a supply voltage via a rectifier which is not explicitly shown in FIG. 2. On the one hand, the rectifier may provide a supply voltage for the lighting means modules or the lighting means 17 accommodated in the lighting means modules, and on the other hand the rectifier may provide a supply voltage for the control module. If necessary, the supply voltage for the control module may be converted into a suitable DC supply voltage via an additional DC converter for the electronic components of the control module, such as the control signal generator.

For example, the lighting device 10 may comprise a central control circuit board 15 on which all external control signals (DALI or ZigBee control signals) may be processed and distributed as digital control signals to several connected lighting means modules arranged on lighting means carrier boards 18 distributed in the lighting device 10. The components of the central control circuit board 15 may be coupled with components of the respective lighting means carrier boards 18 via wired control lines.

The external control signals (DALI or ZigBee control signals) may either be wired via a corresponding plug socket or wirelessly via a suitable radio transceiver or a suitable WLAN access circuit to the central control circuit board 15. The rectifier may comprise a mains voltage input which may be used to apply a mains AC voltage to the lighting device 10.

The LED lighting means 17 of the lighting device 10 may be dimmed analogously. For this purpose, analog dimming is provided via voltage regulators locally assigned to the various lighting means modules, which are connected in series with the respective LED lighting means 17.

Figure 3:
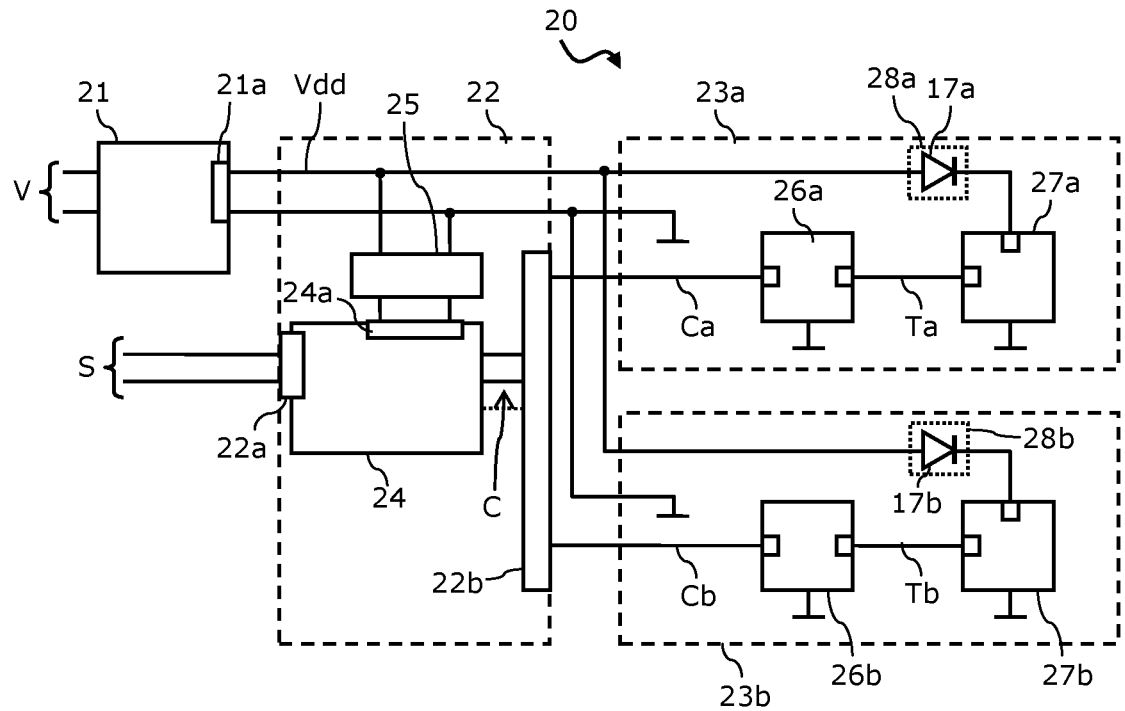
FIG. 3 is a schematic block diagram of functional components of a control device for an LED lighting device according to a further embodiment of the present invention.

FIG. 3 shows a schematic block diagram of functional components of a control device 20 for an LED lighting device. In particular, the control device 20 for LED lighting means 17 may serve the lighting device 10 as explained in connection with FIGS. 1 and 2. Components of the control device 20 may be mounted or implemented in or on the housing component 11 of the lighting device 10. The distribution of the components of the control device shown in FIG. 3 on control circuit board 15 and/or lighting means carrier boards 18 may be carried out as required. In particular, it may also be possible to accommodate all of the components on a single board if a separation into control circuit board and lighting means carrier boards is not desired or expedient.

The control device 20 has a rectifier 21 which serves to convert an AC voltage V into a lighting means supply voltage Vdd. The AC voltage V may be, for example, a 230V or 115V AC mains voltage, which is fed to the rectifier 21 via a mains plug. The lighting means supply voltage Vdd, for example, may be 48 VDC and provided as unipolar or bipolar voltage to components of the control device 20.

First, lighting means modules 23*a* or 23*b* are coupled to a voltage output 21*a* of rectifier 21, which each have one or more first LED lighting means receptacles 28*a* or 28*b* for holding one or more LED lighting means 17*a* or 17*b*. It may be possible that the rectifier 21 supplies only one single lighting means module with a lighting means supply voltage Vdd. In some embodiments, more than two lighting means modules 23*a* or 23*b* are provided, which are each coupled in parallel to the voltage output 21*a* of rectifier 21 and may each be supplied with the lighting means supply voltage Vdd.

A voltage regulator 27*a* or 27*b* is arranged in the lighting means modules 23*a* or 23*b*, respectively, which is connected in series to the one or more LED lighting means receptacles 28*a* or 28*b*, respectively. FIG. 3 shows the series circuit of LED lighting means receptacles 28*a* or 28*b* and voltage regulator 27*a* or 27*b* such that the voltage regulator 27*a* or 27*b* is arranged between LED lighting means receptacles 28*a* or 28*b* and ground. However, it should be clear that a reverse sequence of the LED lighting means receptacles 28*a* or 28*b* and voltage regulator 27*a* or 27*b* may also be implemented. In addition, each of the lighting means modules 23*a* and 23*b* comprises a digital-to-analog converter 26*a* and 26*b*, respectively, which is coupled between a module control signal input of the lighting means module 23*a* and 23*b* and a control input of the respective voltage regulators 27*a* and 27*b*.

For a better understanding, in the following reference is made only to a generic lighting means module 23, omitting the suffixes a/b. It should be understood that each of the lighting means modules 23*a*, 23*b* of the control device 20, which may be connected to the rectifier 21, may comprise one or more of the following features and combinations of features. In particular, it may be possible that all of the lighting means modules 23*a*, 23*b* have the same functional structure of components. Alternatively, it may also be possible to implement different lighting means modules 23*a*, 23*b* of a lighting device 10 with a different structure and function of the components, especially if different LED lighting means 17*a* or 17*b* are to be used in the different lighting means modules 23*a*, 23*b*.

The control device 20 also comprises a control signal generator 24, which may be arranged, for example, on a control module 22. The control signal generator 24 may, for example, be configured as a microprocessor or microcontroller and may comprise an internal configuration memory for storing programmed control configurations for lighting device 10. The control module 22 may be arranged in a lighting device 10 together with the control signal generator 24 on a control circuit board 15. This control circuit board 15 may be located at a distance from one or more lighting means carrier boards 18 within the lighting device 10, each of which comprises one or more lighting means modules 23*a* or 23*b* and digital-to-analog converter 26*a* or 26*b*. The control circuit board 15 and the one or more lighting means carrier boards 18 may comprise standardized connection sockets in order to be flexibly and variably connected to each other via cables, for example.

The control signal generator 24 is supplied with supply voltage by rectifier 21. For this purpose, it may be possible to couple the control signal generator 24 via a DC-DC converter 25 such as a step-down converter between the voltage output 21*a* of the rectifier 21 and a supply input 24*a* of the control signal generator 24. The step-down converter 25 may, for example, reduce a supply voltage of 48 VDC of rectifier 21 to a supply voltage of 3.3 VDC usual for microprocessors or microcontrollers.

In principle, the control signal generator 24 is configured to generate a digital lighting means control signal C and to provide it at a generator output. For this purpose, the control signal generator 24 may comprise a digital input interface 22*a*. At this digital input interface 22*a*, digital input signals such as DALI control signals or ZigBee control signals S are fed into the control signal generator 24 as external control signals. Based on the received digital input signals at the input interface 22a, the control signal generator may generate 24 digital lighting means control signals Sa or Sb for various ones of the lighting means modules 23a or 23b.

The external control signal, such as the DALI control signal or ZigBee control signal S, may, for example, indicate a target value for the dimming of LED lighting means 17. In particular, with LED lighting means 17 arranged on different lighting means modules, 23 different target values may be indicated by the DALI control signal or the ZigBee control signal S. The control signal generator 24 then addresses the respective lighting means modules 23 according to the desired target values. The control signal generator 24 may modulate the digital lighting means control signal C in such a way that control information is transmitted at a constant signal frequency via a variation of the duty cycle.

The digital-to-analog converter 26 of the lighting means modules 23 is coupled to the generator output of the control signal generator 24 via a control module output 22b, at which the respective control signals Ca, Cb for the various lighting means modules 23 are distributed. The digital-to-analog converter 26 of the lighting means modules 23 converts the respective digital lighting means control signal Ca, Cb of the control signal generator 24 into an analog lighting means control signal Ta or Tb. This analog lighting means control signal Ta or Tb may then be fed into the control input of the corresponding voltage regulator 27.

For example, the digital-to-analog converter 26 may comprise a series circuit of a voltage divider and a low-pass filter of first or higher order. Alternatively, the digital-to-analog converter 26 may also comprise a series circuit of an R2R network and a second-order low-pass filter. For example, an R2R network may be implemented by a cascaded sequence of switched voltage dividers that convert the digital lighting means control signal C into a graded analog signal. This analog signal may then be cleaned to high-frequency PWM components by the low-pass filter component. Both options enable a stable and flicker-free control of the voltage regulator 27 and thus provide a uniform light and brightness characteristic of the respective LED lighting means 17.

This is particularly the case if the voltage regulator 27 comprises a linear regulator (such as a series-stabilizing linear regulator) or a switching regulator. If high-voltage LEDs are used for the LED lighting means 17, the voltage regulator 27 may be a linear regulator. High-voltage LEDs generally use almost the entire supply voltage range, such that a linear regulator may be used for high-voltage LEDs with good power efficiency. However, if low-voltage LEDs are used for the LED lighting means 17, a switching regulator may be used as voltage regulator 27 instead of the linear regulator. In both cases, low-loss operation is possible with an analog lighting means control signal Ta or Tb, since no high-frequency switching operations need to be triggered in the voltage regulator 27.

Figure 5:
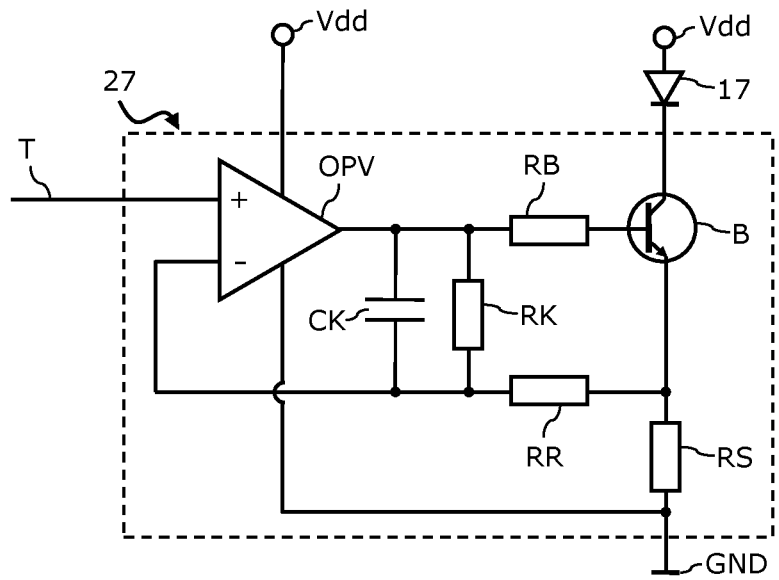
FIG. 5 is a schematic block diagram of a possible circuit for a linear regulator as an adjustable constant current source.

FIG. 5 shows a schematic block diagram for an implementation variant of a linear regulator 27 as an adjustable constant current source. The linear regulator comprises an operational amplifier OPV which operates as a voltage follower. Its output is coupled via a base current limiting resistor RB to the base of a bipolar transistor B—in FIG. 5 an NPN bipolar transistor is shown as an example. The output current of the bipolar transistor B is measured via a voltage divider circuit consisting of a feedback resistor RR and a shunt element RS by feeding the output current to the center tap of the voltage divider circuit and conducting it via the shunt element RS to ground GND. The feedback resistor RR returns the output current of the bipolar transistor B to the inverting input of the operational amplifier OPV, where the output current is compared with the reference target value T. Shunt element RS may comprise for example a single shunt resistor or also a parallel circuit formed from several shunt resistors of different resistance values or power consumption values. A compensation and vibration damping circuit with a vibration damping capacitor CK and a compensation resistor RK connected in parallel may also be provided between the output of the operational amplifier OPV and the feedback path. The compensation and vibration damping circuit CK, RK couples the output of the operational amplifier OPV with its inverting input.

A base current limiting resistor RB is also connected in series between the output of the operational amplifier OPV and the base of the bipolar transistor B. This resistor limits the operating current of the operational amplifier OPV in order to avoid overloading, and protects the operational amplifier OPV from the collector voltage Vdd in the event of an overload or defect of the bipolar transistor B. The base current limiting resistor RB is connected in series between the output of the operational amplifier OPV and the base of the bipolar transistor B. The base current limiting resistor RB is used to limit the operating current of the operational amplifier OPV in order to avoid overloading. In addition, the base current limiting resistor RB may comprise a stabilizing effect on the control loop because the gain value is attenuated.

The transistor shown in FIG. 5 as simple bipolar transistor B may in some cases also be replaced by a Darlington transistor circuit with higher current gain in order to counteract any base current components in the shunt element RS that falsify the current measurement. Such a Darlington transistor circuit may consist of two cascaded bipolar transistors, with the smaller transistor acting as an emitter follower on the base of the larger transistor to increase the current amplification factor of the larger transistor.

Alternatively, a linear regulator as a voltage regulator may also comprise, for example, a transistor connected as an amplified voltage follower, for example a field effect transistor. This transistor is supplied with the input voltage to be regulated. The input voltage to be regulated is further decreased to a reference level via a voltage divider circuit with a band spacing reference, which is compared with the output voltage at the output of the transistor using an operational amplifier. The band spacing reference may, for example, be formed by a Z-diode. By comparison in the operational amplifier, the output signal of the operational amplifier acts as a control signal for controlling the transistor in order to be able to operate the linear controller as an adjustable constant current source.

Figure 4:
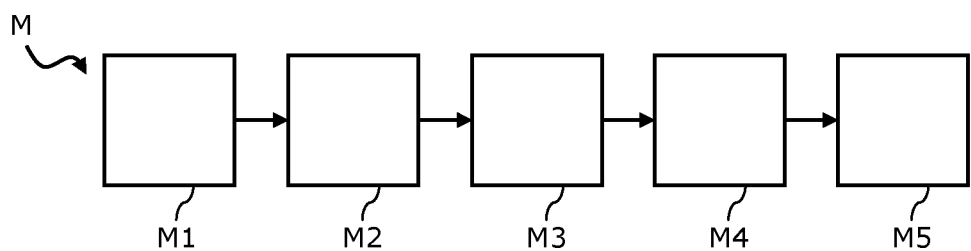
FIG. 4 is an schematic flowchart of an exemplary method for controlling an LED lighting device according to a further embodiment of the present invention.

FIG. 4 shows a schematic flow chart of an exemplary method M for controlling an LED lighting device, in particular for controlling LED lighting means 17 of the lighting device 10 explained in connection with FIGS. 1 and 2. The method M may be implemented in particular by using the control device 20 shown in FIG. 3.

In a first step M1, at least one lighting means module 23, which has one or more LED lighting means 17, is supplied with a DC voltage generated by a rectifier 21. A control signal generator 24, which is supplied with supply voltage by rectifier 21, generates a digital lighting means control signal C in a second step M2.

This digital lighting means control signal C of the control signal generator 24 is fed into a digital-to-analog converter 26 in a third step M3, such that the digital-to-analog converter 26 may convert the digital lighting means control signal C into an analog lighting means control signal Ta or Tb in a fourth step M4, for example by using a series circuit from an R2R network and a second-order low-pass filter. The analog lighting means control signal Ta or Tb converted in this way is used in a fifth step M5 for feeding into a control input of a voltage regulator 27, which is connected in series with one or more lighting means 17. The voltage regulator 27, for example, is a linear regulator (such as a series-stabilizing linear regulator) or a switching regulator.

The digital lighting means control signal C may be generated by the control signal generator 24, particularly on the basis of a DALI control signal or ZigBee control signal S received at an input interface 22a of the control signal generator 24, which, for example, indicates a target value for the dimming of one or more LED lighting means 17. The digital lighting means control signal C may transmit control information at a constant signal frequency by varying the duty cycle.

In the preceding detailed description, various features for improving the stringency of the illustration have been combined in one or more examples. However, it should be understood that the above description is merely illustrative, and is not of a restrictive nature in any way. It serves to cover all the alternatives, modifications and equivalents of the various features and exemplary embodiments. Many other examples will be immediately apparent to a person skilled in the art on the basis of his specialist knowledge in view of the above description.

The exemplary embodiments have been selected and described, in order to be able to present the principles underlying the invention and their application possibilities in practice as well as possible. As a result, a skilled person may modify and use the invention and its various exemplary embodiments in an optimum way with respect to the intended purpose of use. In the claims and the description, the term "having" is used as a neutral term for the corresponding term "comprising". Furthermore, a use of the terms "a", "an" and "one" is not intended to basically exclude a multiplicity of features and components which are described in such a way.

The invention claimed is:

1. A control device for light emitting diodes (LEDs) of a lighting device (10) comprising:
    a first lighting module comprising at least one first LED;
    a first voltage regulator arranged in the first lighting module and connected in series with the at least one first LED;
    a control signal generator configured to generate a digital lighting control signal and to provide the digital lighting control signal at a generator output; and
    a first digital-to-analog converter coupled between the generator output of the control signal generator and a control input of the first voltage regulator, and configured to convert the digital lighting control signal of the control signal generator into an analog lighting control signal and to feed the analog lighting control signal into the control input of the first voltage regulator.

2. The control device according to claim 1, further comprising:
    a rectifier which is configured to convert an AC voltage into a lighting supply voltage,
    the first lighting module being coupled to a voltage output of the rectifier, and the control signal generator being supplied with a supply voltage by the rectifier.

3. The control device according to claim 2, further comprising:
    a DC-DC converter coupled between the voltage output of the rectifier and a supply input of the control signal generator.

4. The control device according to claim 3, wherein the DC-DC converter is a step-down converter.

5. The control device according to claim 1, wherein the first digital-to-analog converter comprises a series circuit of a voltage divider and a first-order or higher-order low-pass filter.

6. The control device according to claim 1, wherein the first voltage regulator comprises a linear regulator.

7. The control device according to claim 6, wherein the linear regulator comprises: a constant current source having an operational amplifier operating as a voltage follower; a bipolar transistor coupled to the output of the operational amplifier via a base current limiting resistor; a shunt element coupled to the emitter of the bipolar transistor; and a compensation and vibration damping circuit which feeds back the output of the operational amplifier to its inverting input.

8. The control device according to claim 1, wherein the control signal generator comprises an input interface and is configured to generate the digital lighting control signal on the basis of a driving signal received at the input interface.

9. The control device according to claim 8, wherein the digital lighting control signal indicates a target value for the dimming of the at least one LED of the first lighting module.

10. The control device according to claim 1, further comprising:
    at least one second lighting module which is coupled to the voltage output of the rectifier and comprises at least one second LED;
    at least one voltage regulator arranged in the second lighting module and connected in series with the at least one second LED; and
    at least one second digital-analog converter which is coupled between the generator output of the control signal generator and a control input of the second voltage regulator and is configured to convert the digital lighting control signal of the control signal generator into an analog lighting control signal and to feed the analog lighting control signal into the control input of the second voltage regulator.

11. A lighting device comprising a control device according to claim 1.

12. The lighting device according to claim 11, wherein the control signal generator is arranged on a control circuit board, the first lighting module and the first digital-to-analog converter are arranged on a lighting carrier board separate from the control circuit board, and wherein the control circuit board is connected to the lighting carrier board via a cable.

13. The lighting device according to claim 11, the at least one first LED comprising a plurality of high-voltage LEDs and the first voltage regulator comprising a linear regulator.

14. The lighting device according to claim 11, the rectifier being configured to rectify an AC mains voltage into a lighting supply voltage of 48 Volt.

15. A method for controlling light emitting diodes (LEDs) of a lighting device, comprising:
    supplying a first lighting module (23a) comprising at least one first LED with a DC voltage generated by a rectifier;
    generating a digital lighting control signal by a control signal generator which is supplied with a supply voltage by the rectifier;
    feeding the digital lighting control signal into a first digital-to-analog converter;

converting, by the digital-to-analog converter, the digital lighting control signal into an analog lighting control signal; and feeding the analog lighting control signal into a control input of a first voltage regulator connected in series with the at least one first LED.

16. The method according to claim 15, wherein the first digital-to-analog converter comprises a series circuit of an R2R network and a second order low pass filter.

17. The method according to claim 16, wherein the digital lighting control signal transmits control information at a constant signal frequency via a variation of the duty cycle.

18. The method according to claim 15, wherein the first voltage regulator comprises a linear regulator.

19. The method according to claim 15, wherein the digital lighting control signal is generated by the control signal generator on the basis of a control signal received at an input interface of the control signal generator.

20. The method according to claim 19, wherein the control signal indicates a target value for the dimming of the at least one first LED.

\* \* \* \* \*